H. T. BENTLEY.
MEANS FOR SECURING RIMS ON WHEELS.
APPLICATION FILED NOV. 1, 1915.
1,177,296.
Patented Mar. 28, 1916.
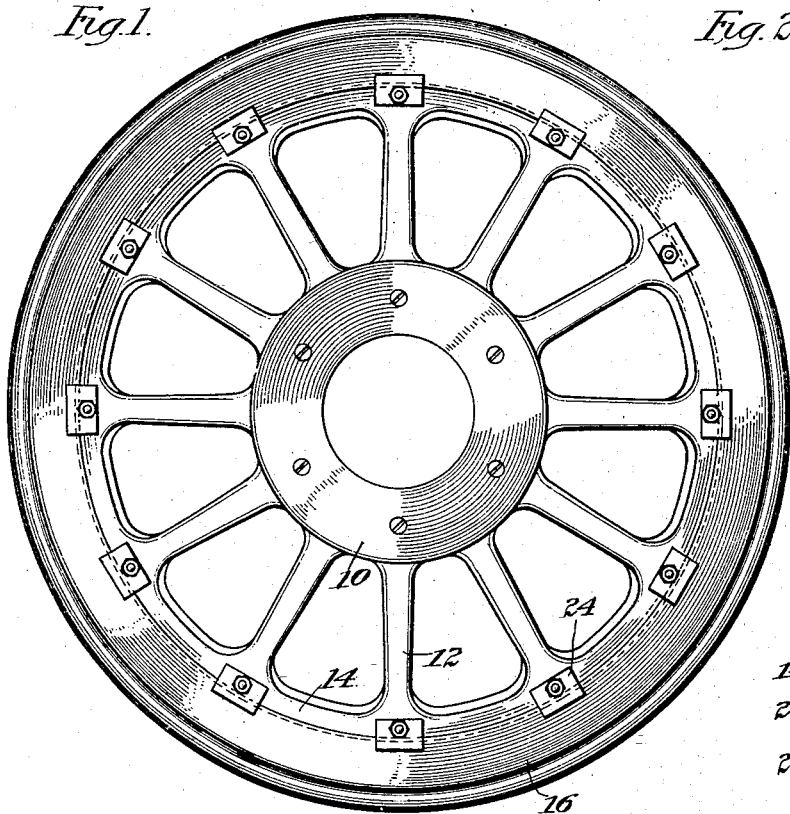
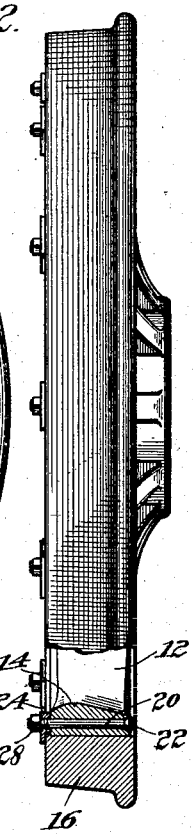
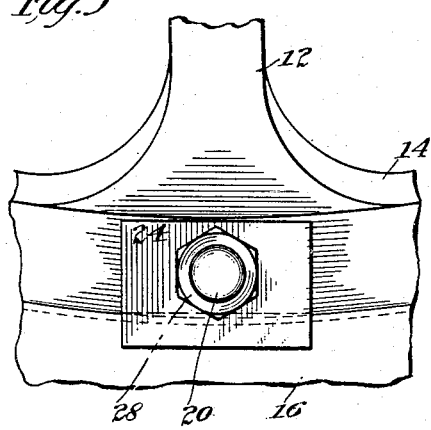
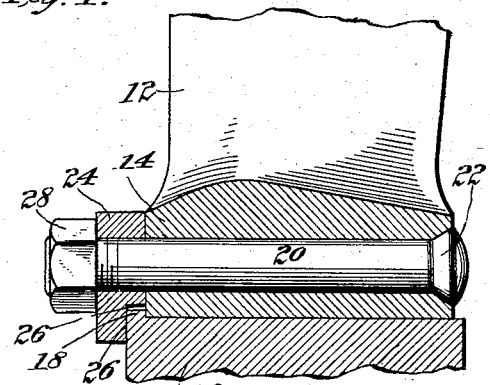

UNITED STATES PATENT OFFICE.

HARRY T. BENTLEY, OF CHICAGO, ILLINOIS.

MEANS FOR SECURING RIMS ON WHEELS.

1,177,296.  Specification of Letters Patent.  Patented Mar. 28, 1916.

Application filed November 1, 1915. Serial No. 59,047.

*To all whom it may concern:*

Be it known that I, HARRY T. BENTLEY, a citizen of the United States, residing at Chicago, in the county of Cook and State of Illinois, have invented a certain new and useful Improvement in Means for Securing Rims on Wheels, of which the following is a specification.

This invention relates to wheels in general; to cast wheels in particular, and still more in particular to the trailer and driving wheels of a locomotive, in which a tire member is shrunk onto the central body member.

The object of the invention is to provide mechanical means readily applicable for securing the tire to the wheel body in the event that the shrinking process fails to properly hold them together in the expected manner, as sometimes happens.

The invention consists in a device capable of carrying out the foregoing objects, which can be easily and cheaply made and applied, which is satisfactory in operation, and not readily liable to get out of order.

The invention further consists in the features and details which will be hereafter more fully described and claimed.

Referring to the drawings, in which similar numerals indicate the same parts throughout the several views, Figure 1 is a front view of a wheel having the device of this invention applied thereto. Fig. 2 is a side view of the same device, the lower portion being in section to show one of the retaining devices. Figs. 3 and 4 are enlarged front and side views of the retaining device, corresponding to Figs. 1 and 2.

The particular wheel here shown is a trailer wheel of a locomotive in which the central body portion 10 is provided with the customary spokes 12 and rim 14. Outside this wheel body is placed the usual steel tire 16 normally shrunk on in the ordinary manner and supposed to stay in place without additional assistance. In practice, this supposition does not always hold true, and the tire sometimes becomes loose. In order to securely hold the tire on the wheel body, notwithstanding the loosening of the normal hold due to shrinking, the following mechanism is provided: On one side of the tire 16 a flange 18 is provided so shaped and arranged that it extends up onto and bears against one side of the rim 14, thus, as shown in Fig. 4, preventing movement of the tire 16 to the right, as viewed in that figure, with reference to the rim 14. A plurality of holes are made through the rim 14 in about the position shown in the figure, and through each one of these holes is placed a bolt 20 having a head 22, preferably engaging the opposite side of the rim 14 from that on which the flange 18 engages it. On the opposite end of this bolt 20 and adjacent to the flange 18 is placed a specially formed block or washer 24 of sufficient size to overlap the flange 18, the same having cut in it a notch 26 within which the adjacent portion of the flange 18 lies. The parts are so proportioned with reference to each other that when the washer 24 is in place and secured thereby by the clamping down of the washer 24 by the nut 28, provided for the purpose, the washer 24 so engages the flange 18 that the washer cannot rotate about the axis of the bolt 20, while the washer itself prevents movement of the tire 16 to the left, as viewed in Figs. 2 and 4.

Of course, it is entirely obvious that the bolt 20, when provided with a suitable head and nut, may be inserted in the opposite direction from that shown in the drawing, and, of course, the details of the shape of the washer and the tire flange may be varied without departing from this invention. It is entirely obvious that the ends of the bolts 20, shown in the drawing, which carry the nuts 28 may have those ends upset into the forms of rivet heads which serve all the functions of the nuts 28; in other words, that rivets may be substituted for bolts 20 without departing from this invention.

Having thus described my invention, what I claim as new and desire to secure by Letters Patent, is:—

The combination of a wheel body with a rim having plane sides recessed only to receive transverse fastening bolts or rivets and having an unbroken single curved surfaced periphery, a tire having an inwardly projecting non-perforated flange flush with one plane side thereof, said flange adapted to overlap one of the plane sides of said rim, locking blocks overlapping said rim and inwardly projecting flange, notched to engage the inner edge of said flange to prevent the rotation of said blocks and perforated to receive the transverse fastening bolts or rivets, and transverse fastening bolts or rivets passing through said rim and inwardly projecting flange to secure said wheel parts together for the purpose set forth.

In witness whereof, I have hereunto subscribed my name in the presence of two witnesses.

HARRY T. BENTLEY.

Witnesses:
W. L. BUNTON,
G. R. SEAVERT.

Copies of this patent may be obtained for five cents each, by addressing the "Commissioner of Patents, Washington, D. C."